(12) United States Patent
Hagale et al.

(10) Patent No.: US 8,140,644 B2
(45) Date of Patent: Mar. 20, 2012

(54) METHOD AND APPARATUS FOR UPDATING APPLICATION SERVERS

(75) Inventors: Anthony Richard Hagale, Austin, TX (US); Srinivas Hasti, Raleigh, NC (US); Ryan Rozich, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1978 days.

(21) Appl. No.: 11/065,539

(22) Filed: Feb. 24, 2005

(65) Prior Publication Data

US 2006/0190581 A1   Aug. 24, 2006

(51) Int. Cl.
*G06F 15/16* (2006.01)
(52) U.S. Cl. ..................................... 709/219
(58) Field of Classification Search .......... 709/220–223, 709/203, 226, 229, 205; 717/169–171; 707/203; 714/15; 370/395.2; 725/132
See application file for complete search history.

(56) References Cited

U.S. PATENT DOCUMENTS

| | | | | |
|---|---|---|---|---|
| 5,635,979 A * | 6/1997 | Kostreski et al. | ............. | 725/132 |
| 5,951,694 A * | 9/1999 | Choquier et al. | ................ | 714/15 |
| 6,058,424 A * | 5/2000 | Dixon et al. | ................... | 709/226 |
| 6,336,134 B1 * | 1/2002 | Varma | ............................ | 709/205 |
| 6,523,036 B1 | 2/2003 | Hickman et al. | ................ | 707/10 |
| 6,622,159 B1 * | 9/2003 | Chao et al. | ..................... | 709/203 |
| 6,675,199 B1 | 1/2004 | Mohammed et al. | ......... | 709/208 |
| 6,681,389 B1 | 1/2004 | Engel et al. | .................... | 717/173 |
| 6,691,165 B1 | 2/2004 | Bruck et al. | ................... | 709/227 |
| 7,020,706 B2 * | 3/2006 | Cates et al. | .................... | 709/229 |
| 7,590,669 B2 * | 9/2009 | Yip et al. | ....................... | 707/203 |
| 2002/0092010 A1 * | 7/2002 | Fiske | ............................. | 717/168 |
| 2002/0180788 A1 * | 12/2002 | Wu | ................................. | 345/752 |
| 2003/0037150 A1 | 2/2003 | Nakagawa | .................... | 709/229 |
| 2003/0037268 A1 | 2/2003 | Kistler | .......................... | 713/310 |
| 2003/0140339 A1 | 7/2003 | Shirley et al. | ................. | 717/171 |
| 2003/0220998 A1 | 11/2003 | Jennings, III et al. | ........ | 709/224 |
| 2006/0031420 A1 * | 2/2006 | Ferguson et al. | ............. | 709/219 |
| 2006/0031920 A1 * | 2/2006 | Pulitzer | ......................... | 725/144 |
| 2006/0153198 A1 * | 7/2006 | Chadha | ....................... | 370/395.2 |
| 2007/0244999 A1 * | 10/2007 | Hamanaka et al. | ........... | 709/220 |

\* cited by examiner

*Primary Examiner* — Dustin Nguyen
(74) *Attorney, Agent, or Firm* — Yee & Associates, P.C.; David A. Mims, Jr.

(57) ABSTRACT

An improved method, apparatus, and computer instructions for managing a set of servers. Responsive to an indication that an alteration of applications on the set of servers providing a service is to occur, a first group of servers and a second group of servers are created from the set of servers. The first group is designated for handling ongoing sessions with unaltered applications. The applications in the second group are altered. A server from the first group is transitioned to the second group as ongoing sessions handled in the first group decrease in number to form a transitioned server, wherein the alteration of the applications are performed without interrupting the service.

20 Claims, 7 Drawing Sheets

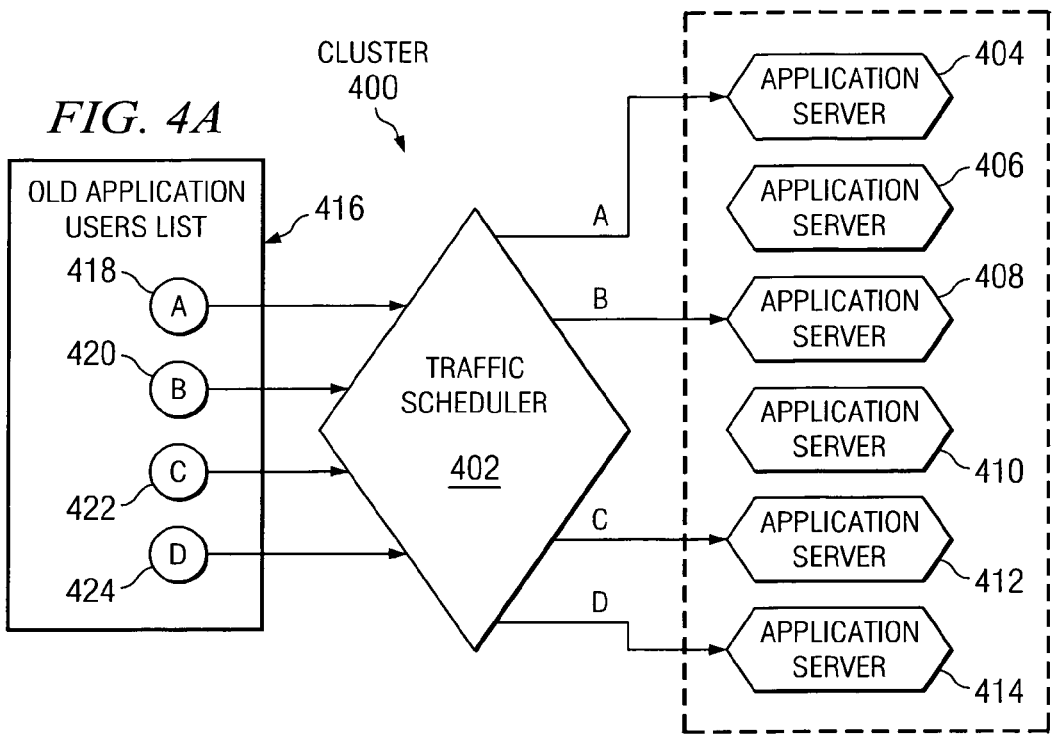
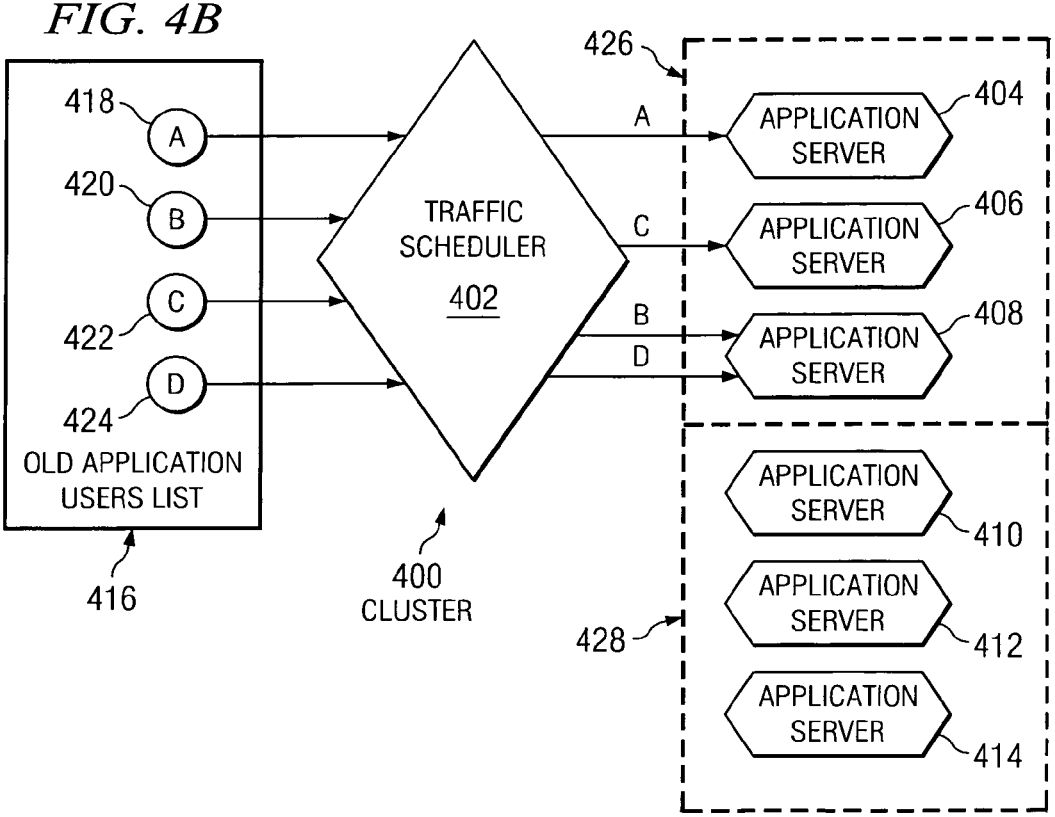

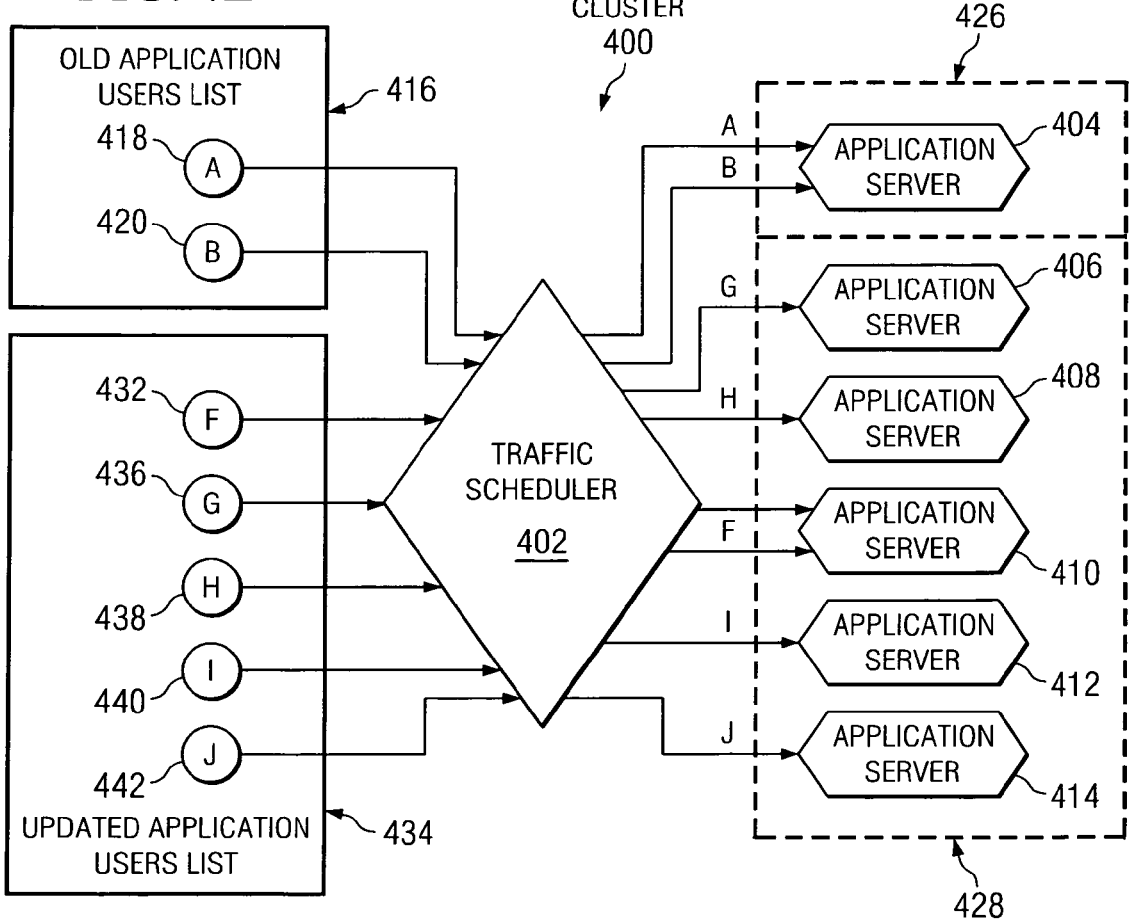

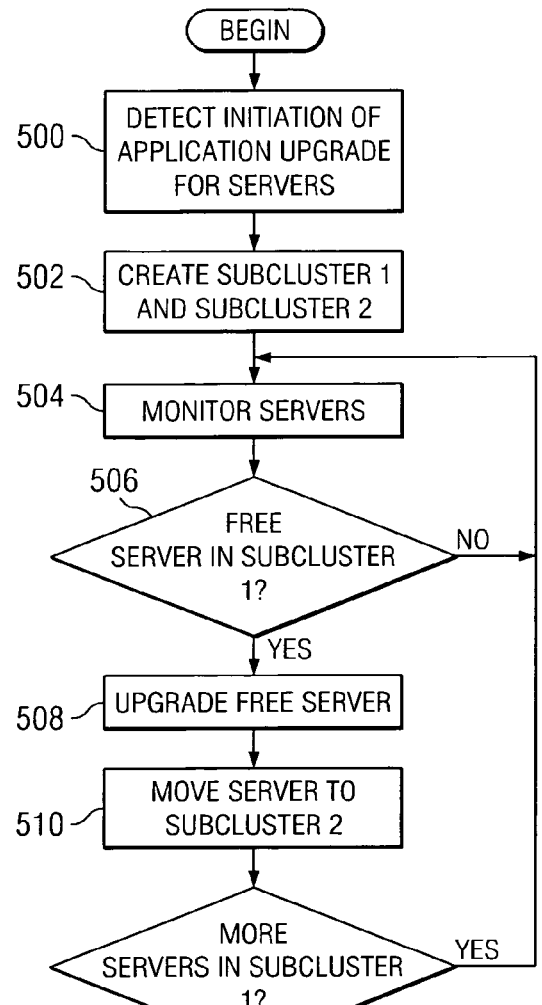
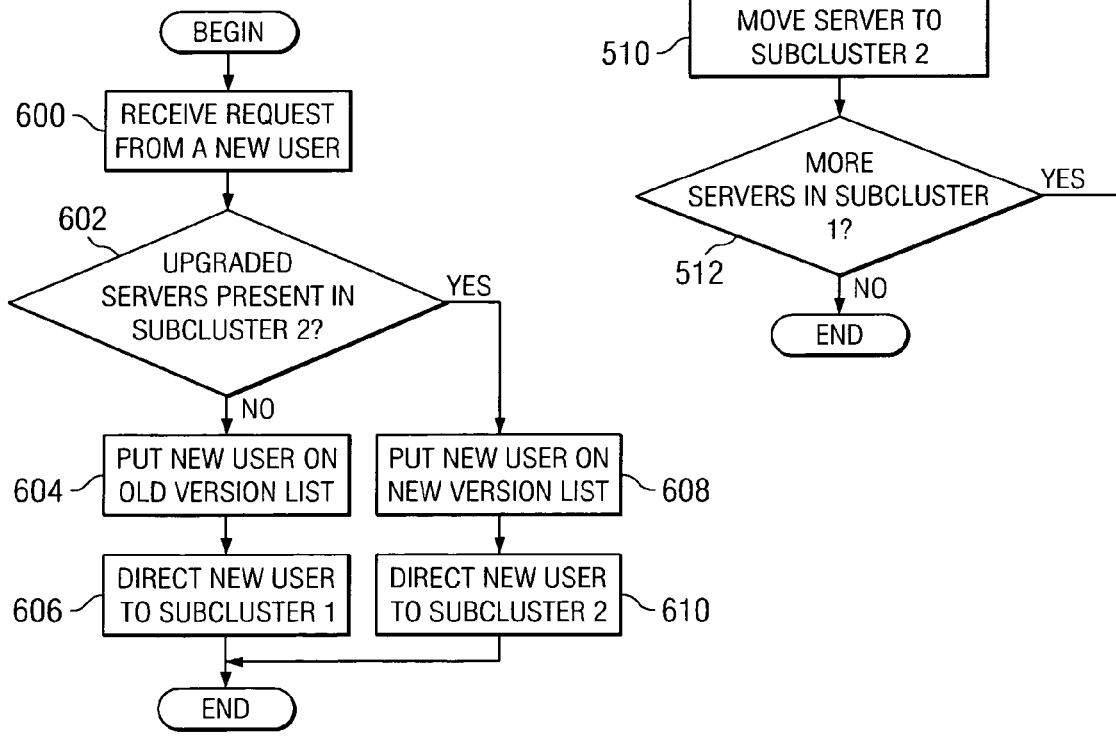

METHOD AND APPARATUS FOR UPDATING APPLICATION SERVERS

BACKGROUND OF THE INVENTION

1. Technical Field

The present invention relates generally to an improved data processing system, and in particular to a method and apparatus for processing data. Still more particularly, the present invention relates to a method, apparatus, and computer instructions for updating application servers.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as, being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web.

In handling requests from different users, a Website may employ multiple servers to handle these requests. Often times, two or more servers are configured or linked such that they are visible on the Web as a single server for handling requests. Computer system administrators are required to maintain and update clusters of servers and applications for which they are responsible. Server update and maintenance often requires taking one or more servers be taken offline. The servers are then updated and then placed back online to handle requests.

Since proper execution of applications on servers often requires that temporary user data be created and maintained on the server for the life of the user's session, it is a requirement that the user session data integrity be preserved through out the maintenance process. For example, Web applications often create "session objects" that are associated with each active user on a one to one basis. If an application is upgraded in a manner the semantics of the session data or adds necessary session data, then the session used by the previous application is no longer usable by the application. Losing user session data in this manner is not acceptable.

An effective method for maintaining and upgrading servers and applications while simultaneously providing continuous availability to applications and integrity of user session data is a requirement. Current solutions to this problem are deficient for a variety of reasons. One solution announces to users that an application will be down for maintenance, and informs users to avoid the Website during down hours.

Another solution mirrors an application server or application server cluster and upgrades the mirrored server/cluster. While reducing the application downtime, this solution still causes current users to loose their session. Therefore, it would be advantageous to have an improved method, apparatus, and computer instructions for updating servers while reducing downtime or lost sessions.

SUMMARY OF THE INVENTION

The present invention provides an improved method, apparatus, and computer instructions for managing a set of servers. Responsive to an indication that an alteration of applications on the set of servers providing a service is to occur, a first group of servers and a second group of servers are created from the set of servers. The first group is designated for handling ongoing sessions with unaltered applications. The applications in the second group are altered. A server from the first group is transitioned to the second group as ongoing sessions handled in the first group decrease in number to form a transitioned server, wherein the alteration of the applications are performed without interrupting the service.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A-4E are diagrams illustrating a process for upgrading application servers while reducing downtime in accordance with a preferred embodiment of the present invention;

FIG. 5 is a flowchart of a process for migrating servers is depicted in accordance with a preferred embodiment of the present invention;

FIG. 6 is a flowchart of an alternative process for migrating servers in accordance with a preferred embodiment of the present invention;

DETAILED DESCRIPTION OF THE PREFERRED EMBODIMENT

Figure 1:
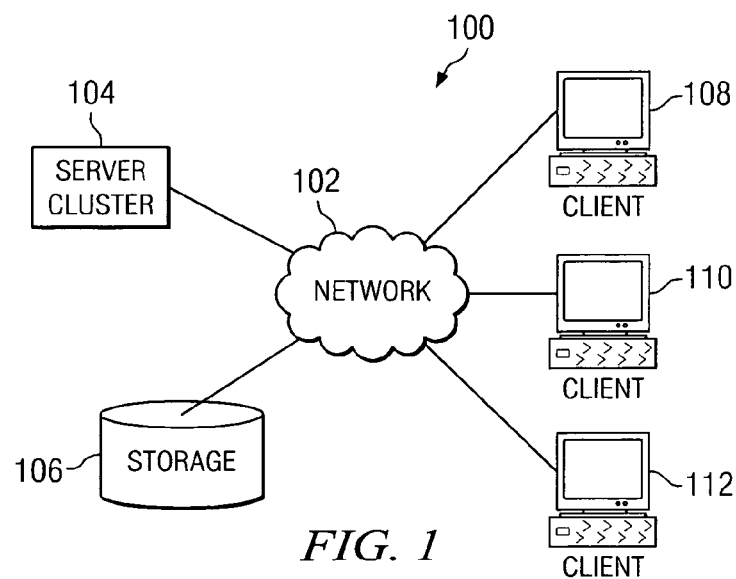
FIG. 1 is a pictorial representation of a network of data processing systems in which the present invention may be implemented.

With reference now to the figures, FIG. 1, a pictorial representation of a network of data processing systems is depicted in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server cluster 104 is connected to network 102 along with storage unit 106. In addition, clients 108, 110, and 112 are connected to network 102. These clients 108, 110, and 112 may be, for example, personal computers or network computers. In the depicted example, server cluster 104 provides data, such as boot files, operating system images, and applications to clients 108, 110, and 112. In these illustrative examples, server cluster 104 functions as an application server for a Website. As used herein, an application server is a server that contains an application that may be accessed remotely. In other words, the business logic or process is located on the server side. Clients 108, 110, and 112 are clients to server cluster 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
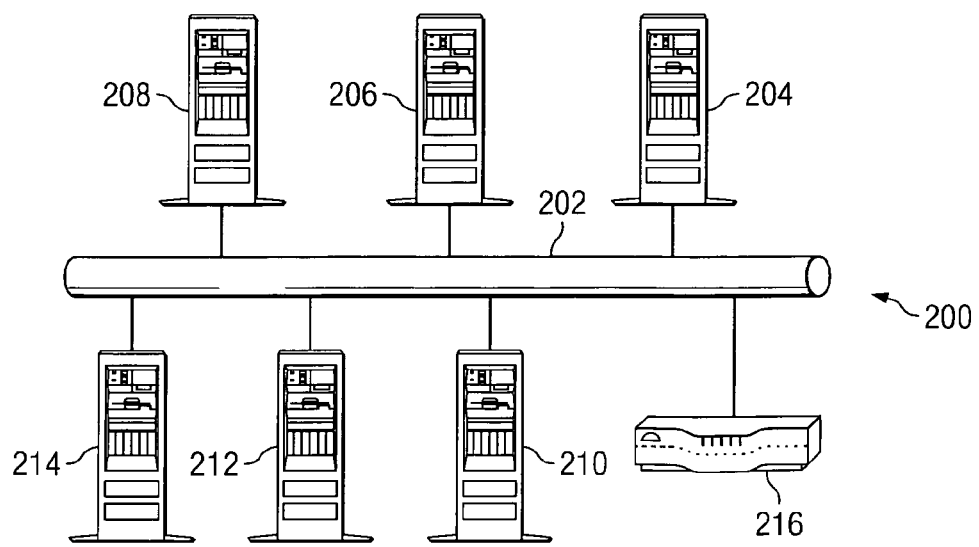
FIG. 2 is a diagram of a server cluster in accordance with a preferred embodiment of the present invention.

Turning now to FIG. 2, a diagram of a server cluster is depicted in accordance with a preferred embodiment of the present invention. Server cluster 200 contains fabric 202, which may be, for example, a bus, an Ethernet network, or some other interconnect system. Servers 204, 206, 208, 210, 212, and 214 are connected to fabric 202 in server cluster 200.

Traffic scheduler 216 is connected to fabric 202 and initially receives all incoming traffic to server cluster 200. Traffic scheduler 216 may take the form of a router. Although shown as a separate physical component, traffic scheduler 216 may be a logical construct distributed through one or more servers in server cluster 200.

An initial request from a client is received by traffic scheduler 216. Load balancing algorithms and/or other policies may be used to direct this initial request to one of the servers in server luster 200. Subsequent request may be handled by traffic scheduler 216 or directly from the server through which a session is initiated. A session, also referred to as a user session, is the session of activity that a user with a unique IP address spends on a Website during a specified period of time. The number of user sessions on a Website is used in measuring the amount of traffic a Website gets.

The time frame of a user session may be set to different lengths of time, such as 5 minutes or 30 minutes. If the visitor comes back to the site within that time period, it is still considered one user session. Any number of visits within that time period is counted as one session.

Figure 3:
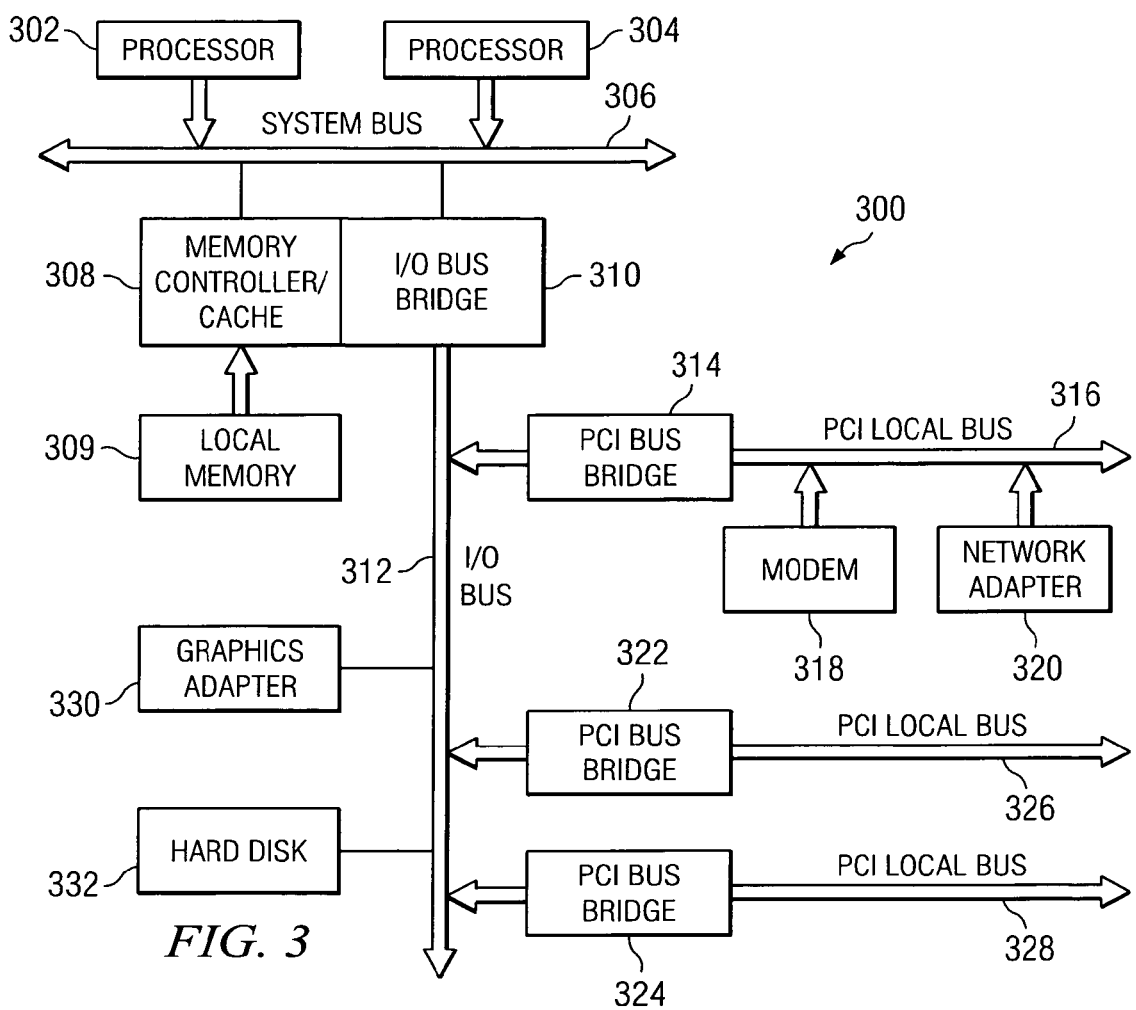
FIG. 3 is a block diagram of a data processing system that may be implemented as a server in accordance with a preferred embodiment of the present invention.

Referring to FIG. 3, a block diagram of a data processing system that may be implemented as a server, such as server 206 in FIG. 2 or a traffic scheduler, such as traffic scheduler 216 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O Bus Bridge 310 is connected to system bus 306 and provides an interface to I/O bus 312. Memory controller/cache 308 and I/O Bus Bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 108, 110, and 112 in FIG. 1 may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system. The present invention provides an improved method, apparatus, and computer instructions for reducing downtime when servers are upgraded. The present invention provides a mechanism for upgrading servers of applications while maintaining user session integrity.

Turning to FIGS. 4A-4E, diagrams illustrating a process for upgrading application servers while reducing downtime are depicted in accordance with a preferred embodiment of the present invention. In this example, in FIG. 4A, cluster 400 contains traffic scheduler 402, which directs traffic to application servers 404, 406, 408, 410, 412, and 414. Cluster 400 may be implemented using cluster 200 in FIG. 2. The different application servers may be each located on a separate server data processing system, or some of these application servers may be located on the same server data processing system.

In this example, an application is hosted on cluster 400. At some point in time, a decision is made to upgrade the application. The application upgrade, in this illustrative example, involves changes in the session data or session-handling data such that users with current sessions open at the time of upgrade will be unable to use the upgraded version of the application.

Traffic scheduler 402 maintains a list of all users currently using the application at the time of the upgrade in list 416. Currently, users 418, 420, 422, and 424 have sessions with the application servers.

In FIG. 4B the mechanism of the present invention creates two logical 'subclusters' within the overall application server cluster, cluster 400. In this example, subcluster 426 and subcluster 428 are created from the application servers in cluster 400. Subcluster 426 contains application servers 404, 406, and 408, while subcluster 428 contains application servers 410, 412, and 414. It is important to note that these two sub-clusters are merely logical groupings of application servers within cluster 400. The overall topology of cluster 400 does not change.

Figure 4C:
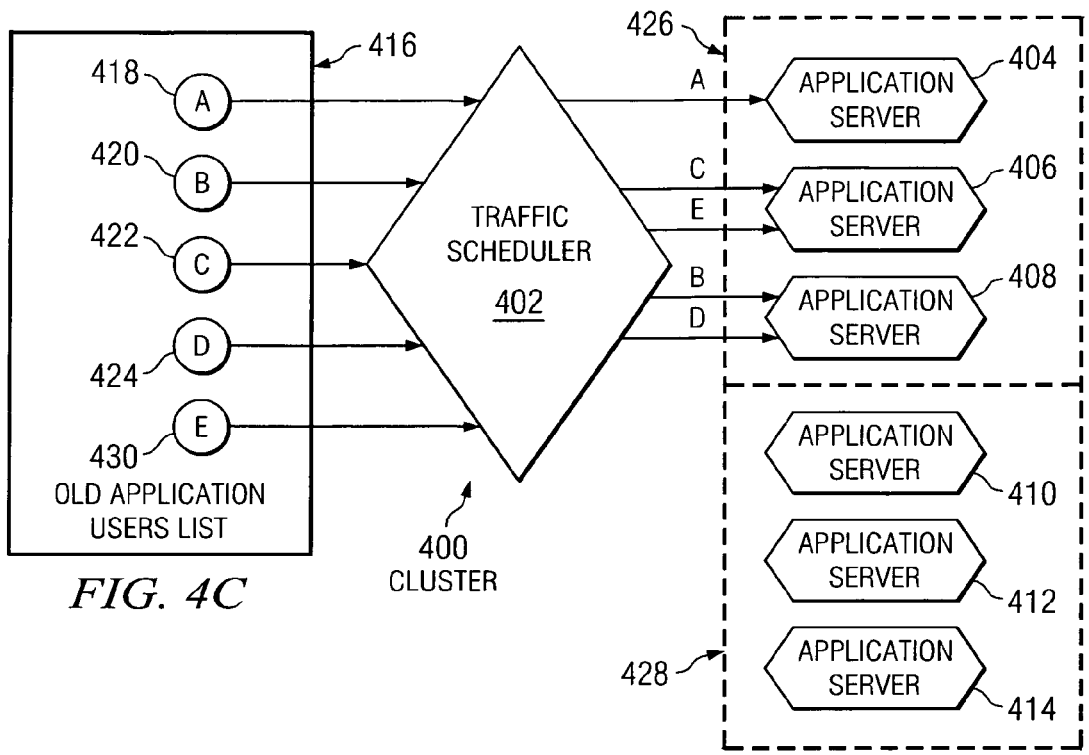

Subcluster 426 contains application servers, which are running the 'old' version of the application. Subcluster 428 contains application servers that are slated to be updated. Traffic scheduler 402 redirects all traffic to subcluster 426. Application servers 410, 412, and 414 in subcluster 428 are then upgraded. During the time that application servers in subcluster 428 are being upgraded all new users also are added to list 416 and redirected to subcluster 426. As can be seen in FIG. 4C, user 430 has sent a request to the application servers, while the upgrade in subcluster 428 is occurring. User 430 is added to list 416 and requests from this user are directed to application servers in subcluster 426.

Figure 4D:
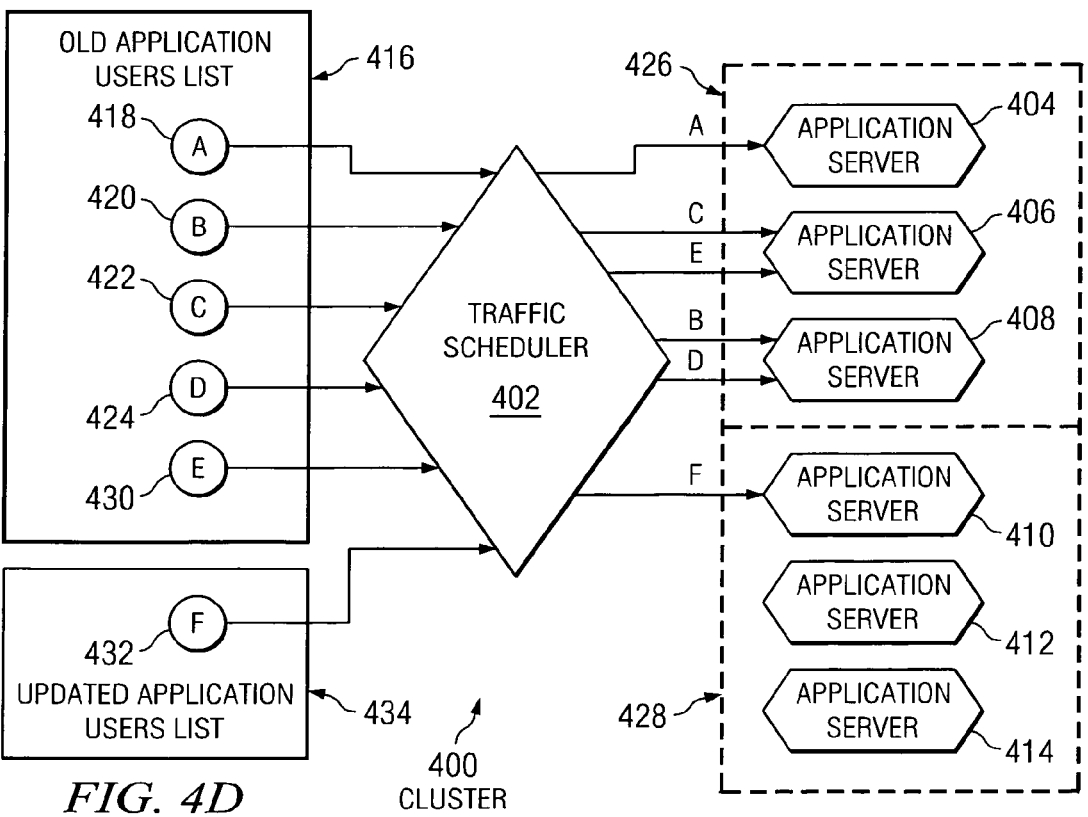

In FIG. 4D, when all of the application servers in subcluster 428 are upgraded, new users are no longer added to list 416. At this time, all new traffic is redirected to subcluster 428. In this example, user 432 is added to list 434, which is a list of updated or new application users.

All users that are on list 416 are directed to the old version of the application running on subcluster 426 and all other new users on list 434 are directed to subcluster 428 by traffic scheduler 402.

Over time users on list 416 drop off through various events such as, longing off or session timeouts. As can be seen in FIG. 4E, users 418 and 420 are still present on list 416, and user 432, 436, 438, 440, and 442 are present on list 434. Application servers 406 and 408 have been transferred from subcluster 426 to subcluster 428 so that the number of application servers in subcluster 426 compared to the number of servers in subcluster 428 is proportional to the number of users associated with each subcluster. After the last old-application-users session times out, the final application server, application server 404 in subcluster 426 is upgraded and migrated to subcluster 428. At this time, all users now use the upgraded application. With the mechanism of the present invention, this upgrade occurs without resetting any user session, or any user experiencing an interruption in service.

Turning to FIG. 5, a flowchart of a process for migrating servers is depicted in accordance with a preferred embodiment of the present invention. The process illustrated in FIG. 5 may be implemented in a traffic scheduler, such as traffic scheduler 216 in FIG. 2.

The process begins by detecting an initiation of an application upgrade for servers in the cluster (step 500). Thereafter, the process then creates two subclusters, subcluster 1 and subcluster 2 (step 502). Subcluster 1 is similar to subcluster 426 in FIG. 4. More particularly, subcluster 2 is similar to subcluster 428 in FIG. 4. These two subclusters are logical subclusters. The servers in these two subclusters are monitored (step 504). Next, a determination is made as to whether a free server is present in subcluster 1 (step 506). A free server is identified when one of the servers in subcluster 1 is not handling a session with a user.

Thereafter, if a free server is found, this server is upgraded (step 508). The upgraded server is then moved to subcluster 2 (step 510). The process then checks to see if more servers are present in subcluster 1 (step 512). If more servers are not present in subcluster 1 step 512 the process is terminated thereafter.

Turning back now to step 506, if a free server is not present in subcluster 1, the process returns back to step 504 to monitor the servers until a free server in subcluster 1 if found step 506.

In this manner, a traffic scheduler may be employed to prevent interruptions or downtime in services being provided by application servers. The process in FIG. 5 shifts servers from handling sessions using applications without upgrades to upgraded applications as users having current sessions on servers using applications without upgrades drop off or terminate those sessions.

Turning to FIG. 6, a flowchart of an alternative process for migrating servers is depicted in accordance with a preferred embodiment of the present invention. The process illustrated in FIG. 5 may be implemented in a traffic scheduler, such as traffic scheduler 216 in FIG. 2.

The process begins by receiving a request from a new user (step 600). A determination is made as to whether upgraded servers are present in subcluster 2 (step 602). Step 602 is used to determine when new users may be directed to servers with upgraded applications. If upgraded servers are not present in subcluster 2, the process puts the new user on an old version list (step 604). This list is similar to list 416 in FIG. 4A. The new user is then directed to subcluster 1 (step 606) with the process terminating thereafter.

Turning back to step 602, if the determination is made that there are upgraded servers present in subcluster 2, the new user is added to the new user list (step 608). This list is similar to list 434 in FIG. 4D. Then, the new user is directed to subcluster 2 (step 610) with the process terminating thereafter. The directing or routing of requests from users to the different subclusters is based on the list populated by the traffic scheduler in these illustrative examples.

In this manner, a traffic scheduler may be employed to prevent interruptions or downtime in services being provided by application servers. The process in FIG. 5 shifts servers from handling sessions using applications without upgrades to upgraded applications as users having current sessions on servers using applications without upgrades drop off or terminate those sessions.

Figure 7:
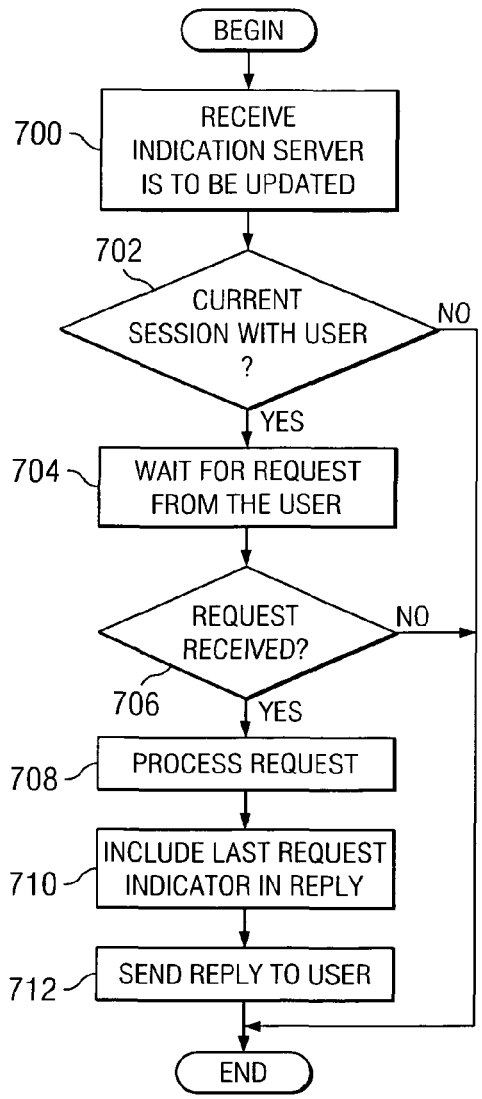
FIG. 7 is a flowchart of an alternative process for migrating servers in accordance with a preferred embodiment of the present invention.

Turning to FIG. 7, a flowchart of an alternative process for migrating servers is depicted in accordance with a preferred embodiment of the present invention. The process illustrated in FIG. 7 may be implemented in an application server, such as application server 204 in FIG. 2.

The process begins by receiving an indication that the server is to be updated (step 700). A determination is made as to whether there is a current session with a user (step 702). If a current session with the user is present, the process waits for a request from the user (step 704). If a request is received from the user (step 706), the request is processed (step 708).

Next, a last request indication is included in a reply (step 710), and the reply is sent to the user (step 712) with the process terminating thereafter. This indication is used by a router or traffic scheduler to assign the session to another server using the old application.

Turning back to step 702, if a current session with a user is not present, the process terminates. The process also terminates in step 706 when a request is not received after waiting for a request in step 704. In this case, a timeout for the session has occurred.

Figure 8:
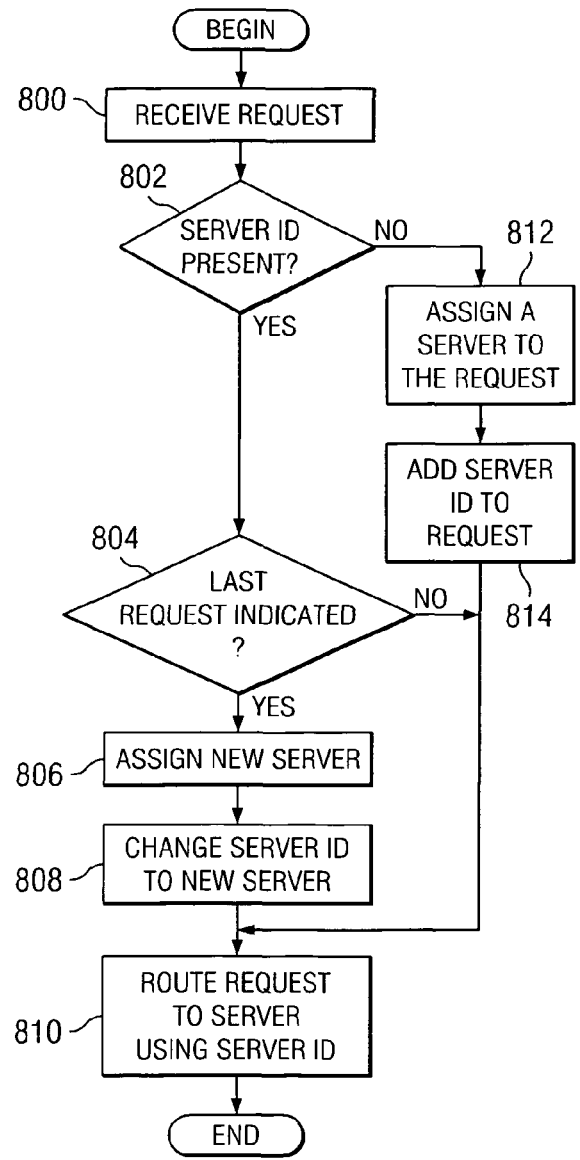
FIG. 8 is a flowchart of an alternative process for migrating servers in accordance with a preferred embodiment of the present invention.

Turning to FIG. 8, a flowchart of an alternative process for migrating servers is depicted in accordance with a preferred embodiment of the present invention. The process illustrated in FIG. 6 may be implemented in a traffic scheduler, such as traffic scheduler 402 in FIG. 4.

The process begins by receiving a request (step 800). This request is received from a user at a client. A determination is made as to whether a server ID is present in the request (step 802). If the server ID is present, a determination is made as to whether an indication is present indicating that the request is a last request (step 804).

Next, if a last request indication is present, the process assigns a new server (step 806). In assigning a new server in step 806, the traffic scheduler assumes that the last request indication is for an ongoing session that may require a server with an old version of the application, rather than an upgraded version of the application. Next, the server ID is changed to a server ID associated with the new server (step 808). The request is routed to the server using the server ID (step 810), with the process terminating thereafter.

Turning back to step 802, if a determination is made that a server ID is not present, a server is assigned to the request (step 812). In this case, the request is assigned to a server containing the upgraded application. A server ID is then added to the request (step 814). The request is routed to the server using server ID step 810, with the process terminating thereafter.

Turning back now to step 804, if the determination is made that a last request is not indicated, the request is routed to the server using server ID step 810 with the process terminating thereafter. In this manner, the processes in FIG. 7 and FIG. 8 provide an alternative mechanism for maintaining affinity for associating sessions with servers by including routing information directly in the session identifier of a request. This session identifier may be, for example, a cookie or a rewritten URL. The session identifier includes a suffix or other additional information used to identify the server that is to serve the application.

Further, this alternative mechanism may include a session-timeout parameter that is set for the server. This feature guarantees that the server will be upgraded in a time period that is no longer than the session timeout.

Thus, The present invention provides an improved method, apparatus, and computer instructions for upgrading applications on application server while minimizing downtime for users. The mechanism of the present invention creates two logical groups of servers. One group continues to service users with the old application while the other group is upgraded. As users with ongoing sessions using the old application drop off or terminate sessions, servers from the first group may be upgraded and transitioned to the second group. In this manner, these upgraded occur without resetting user sessions or interrupting service.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the depicted embodiments show two logical clusters. More than two groupings may be used depending on the particular implementation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a set of servers, the method comprising:
   responsive to an indication that an alteration of an application on the set of servers providing a service is to occur, creating a first group of servers and a second group of servers from the set of servers, wherein the first group of servers is designated for handling ongoing sessions with an unaltered application;
   altering the application on the second group of servers; and
   transitioning a server from the first group of servers to the second group of servers as ongoing sessions handled in the first group of servers decrease in number to form a transitioned server, wherein the alteration of the application is performed without interrupting the service.

2. The method of claim 1 further comprising:
   directing requests in ongoing sessions to the first group of servers: and
   directing requests for new sessions to the second group of servers after the alteration has occurred.

3. The method of claim 2 further comprising:
   monitoring all servers in the first group of servers to determine if a given server in the first group of servers has become free; and
   responsive to the given server becoming free, altering the application on the given server and then transitioning the given server from the first group of servers to the second group of servers.

4. The method of claim 3, wherein the directing steps are performed by a traffic scheduler.

5. The method of claim 4, wherein the traffic scheduler maintains a list identifying users of the unaltered application that is used to direct requests.

6. The method of claim 3, wherein the directing steps are performed by a router examining a server identifier located in each request.

7. The method of claim 6, wherein the server identifier is located within a session identifier that identifies one of the sessions.

8. The method of claim 1, wherein the alteration is an upgrade of the application in which a manner in which the application handles session data changes.

9. The method of claim 8, wherein users with current sessions that are open at the time of the upgrade are unable to use the upgrade of the application.

10. A data processing system for managing a set of servers, the data processing system comprising:
    a central processing unit (CPU), a computer readable memory, and a computer readable storage device;
    first instructions, responsive to an indication that an alteration of an application on the set of servers providing a service is to occur, to create a first group of servers and a second group servers from the set of servers, wherein the first group of servers is designated for handling ongoing sessions with an unaltered application;

second instructions to alter the application on the second group of servers; and third instructions to transition a server from the first group of servers to the second group of servers as ongoing sessions handled in the first group of servers decrease in number to form a transitioned server, wherein the alteration of the application is performed without interrupting the service; and wherein the first, second and third instructions are stored on the computer readable storage device for execution by the CPU via the computer readable memory.

11. The data processing system of claim 10 further comprising:

fourth instructions to direct requests in ongoing sessions to the first group of servers; and fifth instructions to direct requests for new sessions to the second group of servers after the alteration has occurred.

12. The data processing system of claim 11, further comprising:

sixth instructions to monitor all servers in the first group of servers to determine if a given server in the first group of servers has become free; and seventh instructions, responsive to the given server becoming free, to alter the application on the given server and then transition the given server from the first group of servers to the second group of servers.

13. The data processing system of claim 12, wherein the fourth instructions and the fifth instructions are located in a traffic scheduler.

14. A computer program product embodied in a computer readable storage-type media for managing a set of servers, the computer program product comprising:

first instructions, responsive to an indication that an alteration of an application on the set of servers providing a service is to occur, to create a first group of servers and a second group of servers from the set of servers, wherein the first group of servers is designated for handling ongoing sessions with an unaltered application;

second instructions to alter the application on the second group of servers; and third instructions to transition a server from the first group of servers to the second group of servers as ongoing sessions handled in the first group of servers decrease in number to form a transitioned server, wherein the alteration of the application is performed without interrupting the service.

15. The computer program product of claim 14 further comprising:

fourth instructions to direct requests in ongoing sessions to the first group of servers; and fifth instructions to direct requests for new sessions to the second group of servers after the alteration has occurred.

16. The computer program product of claim 15 further comprising:

sixth instructions to monitor all servers in the first group of servers to determine if a given server in the first group of servers has become free; and seventh instructions, responsive to the given server becoming free, to alter the application on the given server and then transition the given server from the first group of servers to the second group of servers.

17. The computer program product of claim 16, wherein the fourth instructions and the fifth instructions are executed by a traffic scheduler.

18. The computer program product of claim 17, wherein the traffic scheduler maintains a list identifying users of the unaltered application that is used to direct requests.

19. The computer program product of claim 16, wherein the fourth instructions and the fifth instructions are executed by a router examining a server identifier located in each request.

20. The computer program product of claim 19, wherein the server identifier is located within a session identifier that identifies one of the sessions.

* * * * *